A. MATTSON.
SEINE.
APPLICATION FILED DEC. 22, 1913.

1,141,128.

Patented June 1, 1915.
2 SHEETS—SHEET 1.

WITNESSES:

INVENTOR:
Anders Mattson
BY Frederick Benjamin
ATTORNEY

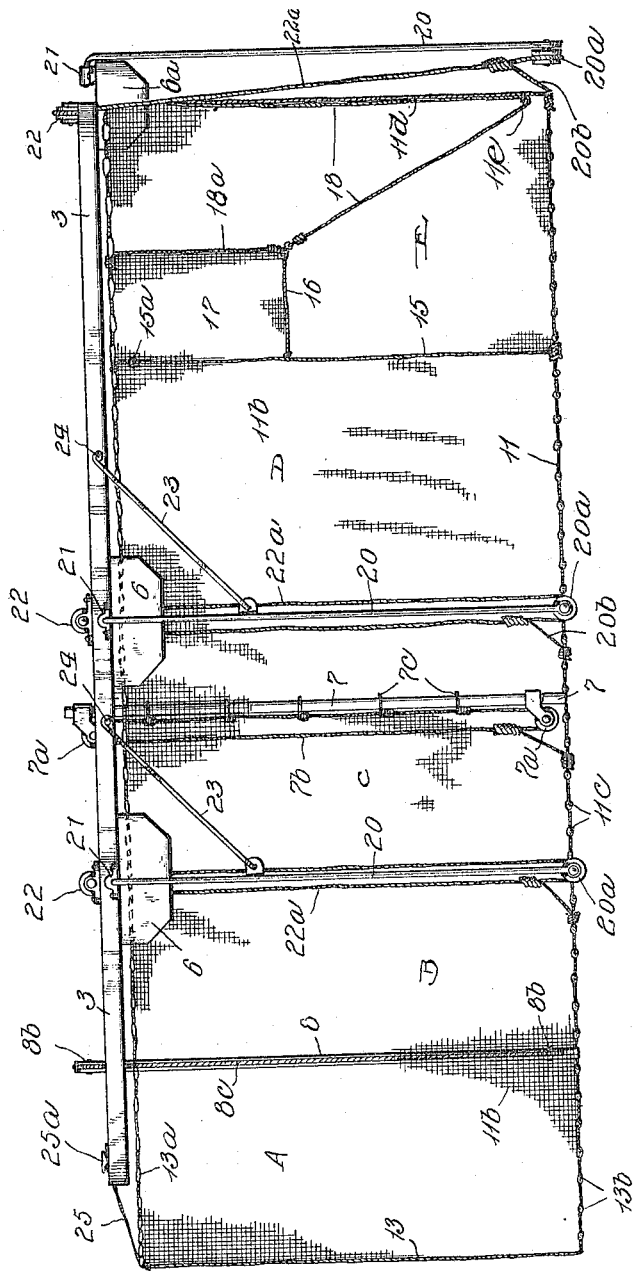

UNITED STATES PATENT OFFICE.

ANDREW MATTSON, OF BELLINGHAM, WASHINGTON.

SEINE.

1,141,128.  Specification of Letters Patent.  Patented June 1, 1915.

Application filed December 22, 1913. Serial No. 808,098.

*To all whom it may concern:*

Be it known that I, ANDREW MATTSON, citizen of the United States, residing at Bellingham, in the county of Whatcom and State of Washington, have invented certain new and useful Improvements in Seines, of which the following is a specification.

This invention relates to improvements in seines of the type which are adapted to be drawn through the water by suitable tow lines and to gather the fish into pockets.

The special object of the improvements embodied herein is to provide a floating fish net or seine especially adapted for deep sea fish and which avoids the objections incident to many types of fish traps.

The construction embodied in this application consists generally of a central or lead portion and two headers at the respective ends of the central section said headers comprising suitable frames and pontoons and a series of pockets into which the fish are drawn or swim and from which they cannot easily escape.

In the accompanying drawings forming a part of this application I have illustrated a preferred embodiment of my invention in the following views:—

Figure 1:
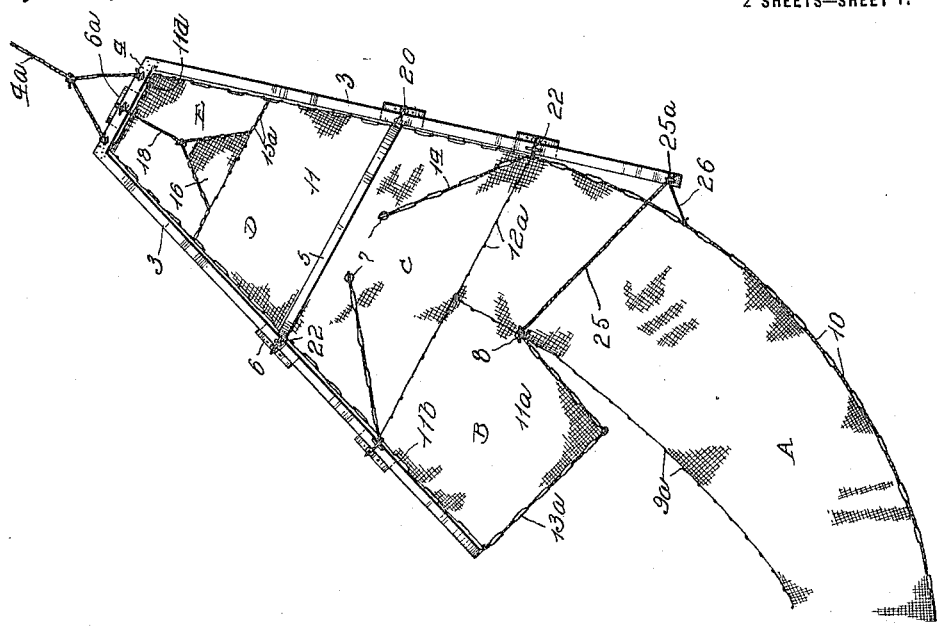
Figure 1:
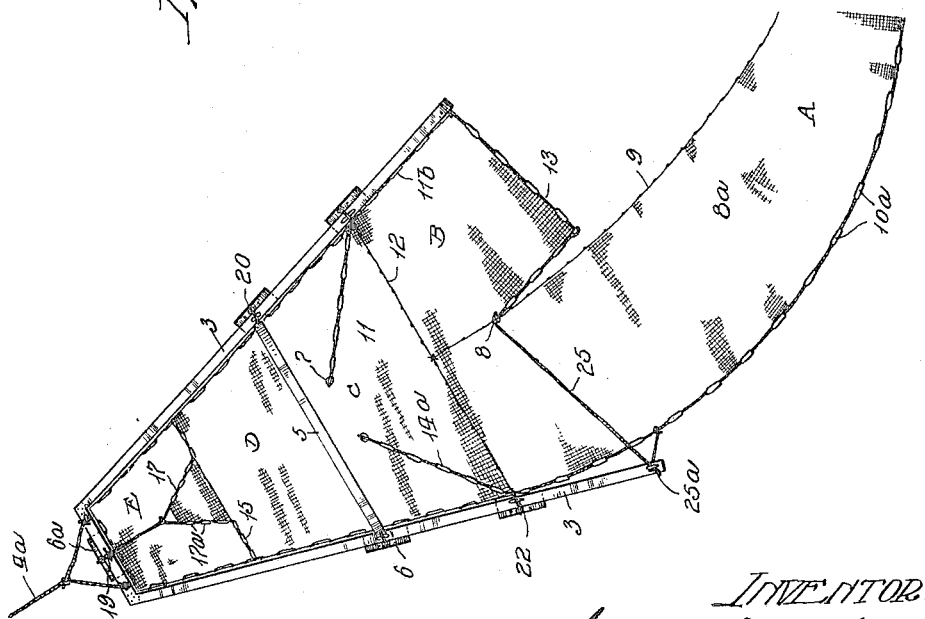

Figure 1 is a plan view of the complete seine except a small portion of the central section which is removed; Fig. 2 is a side elevation of one of the headers of which there are two in my improved seine.

Referring to the details of the drawing, the reference character A represents the lead or central portion of my improved seine which is semi-circular in form and has secured to its forward edge the line 9 weighted by leads $9^a$. Around the outer edge of the lead A is a line 10 carrying floats or corks $10^a$. The relative portions and positions of the lines 9 and 10 cause the net A to form a large bag into which the fish swim or are caught as the seine is drawn forward. The ends of this bag communicate directly with pockets B which in turn communicate with second pockets C which lead to other pockets D and E. The pockets B, C, D, and E, are flanked by beams 3, arranged in the triangular form shown and connected at their forward ends by a cross-piece 4 with which the tow lines $4^a$ are directly connected. Midway of their lengths the beams 3 are connected and braced by a cross beam 5. To give greater buoyancy to the same I provide floats 6, $6^a$, which are arranged at the sides and ends respectively of the frames formed by the beams 3 and 4.

To maintain the netting which forms the body material of the seine in operative position, I provide a series of pipes and posts 7 and 8 on the respective ends of which are carried pulleys $7^a$, $8^b$, respectively, and over these pulleys are arranged ropes $7^b$, $8^c$, the ends of which are connected with the bottom 11 of the seine. The posts 7 and 8 are arranged intermediate the beams 3 and have connected therewith stretches of seine fabric 13, 14, carrying corks or floats $13^a$, $14^a$, respectively. The lines 13 constitute the jiggers of my improved seine, and when the latter is being towed these jiggers will be held by the posts 8 in the position shown in Fig. 1, but as soon as it is desired to inclose the fish in the headers and outer pocket B, the jigger is drawn across the entrance to the outer seine pocket B by the rope 25, thus forming a substantial barrier to the escape of the fish from the header pockets.

The bottom of the seine is equipped with leaded lines 12, $12^a$. The pockets D and E are separated by lines 15, the top of which are provided with corks or floats, and the bottom of which are provided with leads. Openings are left in said lines through which fish may pass from the pocket D into the seine sections formed by the bottom walls 16 and the side walls 17. Openings from said sections are provided into the inner pocket E at the extreme forward ends of the header and the walls of the seine sections are maintained in their proper position during the operation of the seine by the rope 18 which extends downwardly and passes through an eye $11^e$ near the lower corner of the pocket E, and then upwardly to the frame member 3 where it is secured. The walls of the pocket E are maintained in operative position by a rope $22^a$ which is connected with the lower corner of the pocket by a short stretch of rope $20^b$ and said rope passes over a pulley 22 mounted at the top of the frame and also over a pulley $20^a$ mounted at the lower end of the swinging rod 20 the upper end of which is pivoted in a bearing 21 secured to the top of the pontoon member $6^a$. Similar rods and ropes are arranged at intervals along the sides of the header.

Connected with the rods 20 are braces 23 which extend upwardly and are connected at their upper ends with eyes 24 on the frame members 3. Cleats 25ª are provided at the ends of the outer frame members 3 to which are secured the jigger operating ropes 25 and also short stretches of rope 26, which connect it with the line 10 on the outer and upper edge of the lead section A.

The posts 7 carry ropes 7ᵇ and the pulleys 7ª over which said ropes run, the latter, together with the ropes 22ª, being used to draw up the bottom of the seine when not in use. The pockets are lashed to the frame members when not in use and are in position to be let down as soon as it is desired to use the seine again.

Having thus described my invention what I claim is:—

1. A trawling seine comprising a central lead section consisting of a net provided with floats along its upper edge and sinkers along its lower edge, said lower edge extending forward from said upper edge and headers communicating with the opposite ends of said lead section, said headers consisting of communicating pockets partially spaced by inclined nets suitably supported at their inner edges, the outer pocket having a jigger net, devices by means of which the walls of said jigger may be drawn against the inner ends of said lead, and means for collapsing and drawing the bottom and sides of the net up to the frame work supporting said net.

2. A trawling seine comprising a central lead portion consisting of a net having floats along its rear edge and sinkers along its forward edge, said forward edge being shorter than the rear edge so as to extend the former normally in front of the latter and headers arranged in the opposite ends of said lead, each of said headers composed of beams arranged in triangular form and suitable braces and having floats supporting same, said headers being divided into a series of communicating pockets the outer pocket having a jigger net, devices by means of which the walls of said jigger may be drawn across the inner sides of said lead, and means for collapsing and drawing the bottom and sides of the net up to the above mentioned frame work, the last mentioned means comprising a plurality of posts, pulleys suitably mounted on said posts and ropes running over and intercommunicating with said pulleys and connecting with the bottom wall of said net.

In testimony whereof I affix my signature in the presence of two witnesses.

ANDREW MATTSON.

Witnesses:
E. W. VAN HORN,
L. H. BALDY.

Copies of this patent may be obtained for five cents each, by addressing the "Commissioner of Patents, Washington, D. C."